Patented May 8, 1934

1,957,580

UNITED STATES PATENT OFFICE 1,957,580

PROCESS OF PREPARING AZO DYESTUFFS CONTAINING COPPER

Detlef Delfs and Rudolf Knoche, Leverkusen I. G.-Werk, Germany, assignors to General Aniline Works, Inc., New York, N. Y., a corporation of Delaware No Drawing. Application September 17, 1932, Serial No. 633,679. In Germany September 28, 1931

22 Claims. (Cl. 260—12)

The present invention relates to a process of preparing azo dyestuffs containing copper in a complex form and to the new products obtainable thereby, more particularly it relates to a process of preparing copper compounds of ortho-hydroxy-azodyestuffs by coppering azodyestuffs containing at least once the grouping

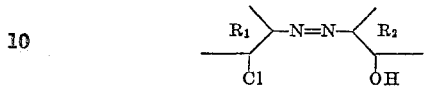

wherein $R_1$ and $R_2$ stand for radicals of the benzene or naphthalene series, for instance, for a benzene or naphthalene nucleus which may be further substituted by substituents, such as the sulfonic acid group; the carboxylic acid group; halogen; alkyl, such as methyl or ethyl; hydroxy; alkoxy, such as methoxy or ethoxy; hydroxy alkyl, such as hydroxy-methyl or -ethyl; aryl such as phenyl, for instance, in case dichlorobenzidine is used as diazotization component; aralkyl, such as a radical of the benzyl series, for instance, in case an ortho-chloro-amino-diphenyl methane is used as diazotization component; or a hydroxy diphenyl methane as coupling component; the amino group, a substituted amino group such as an acyl-, alkyl-, aralkyl- or -aryl-amino group for instance, an acetylamino, benzoylamino, methyl- or ethyl amino, benzylamino or phenylamino group; the nitro group in a caustic alkaline medium at an elevated temperature until by substitution of the chlorine atom in ortho-position with respect to the azo bridge by a hydroxy group the copper complex compounds of the corresponding ortho-hydroxy-azodyestuffs have formed.

As agents yielding copper there may be used finely divided copper or copper compounds generally used in the art of preparing copper containing azodyestuffs, for instance, copper oxide or hydroxide, copper salts, such as cupric sulfate and cupric chloride, further, the complex compounds of copper with inorganic or organic bases, for example, the complex compounds of cupric sulfate with ammonia, pyridine or ethylene diamine, or further the copper complex compounds of organic hydroxy compounds, for instance, of glycerine or tartaric acid.

The temperature required for performing our new process depends upon the specific dyestuff to be coppered, but as a general rule there may be stated that the coppering can be performed between about 50° C. and about 120° C., it being understood that temperatures beyond the limits given fall within the scope of our invention. The time required for completing our new process likewise depends upon the specific azodyestuff to be coppered, and, of course, upon the specific temperature used in such a manner that lower temperatures require a longer time, and vice versa. As stated above the process is complete when all the chlorine in ortho-position with respect to the azo bridge has been split off with the formation of the copper complex compound of the corresponding ortho-hydroxy-azo dyestuff.

The proceeding of the coppering process can be seen from a change in coloration of the reaction mass, coppering being complete when a change in coloration is no longer detectable.

By our new process it is possible to prepare copper containing azodyestuffs which are not or only difficultly obtainable according to the known methods of preparing dyestuffs of the type in question.

The copper containing ortho-hydroxy-azodyestuffs are generally dark powders, soluble in water if they contain a solubilizing group or groups.

The invention is further illustrated by the following examples without being restricted thereto:

*Example 1*

10 parts by weight of the dyestuff obtainable by coupling diazotized 2-chloro-1-aminobenzene-5-sulfonic acid with beta-naphthol, and having the formula:

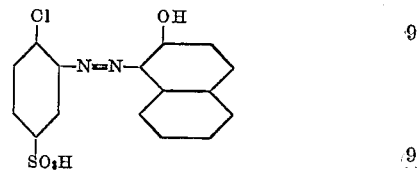

are dissolved in 400 parts by weight of hot water. After the addition of 20 parts by weight of an aqueous solution of caustic soda of 40° Bé. and 20 parts by weight of 25% ammonia a solution of tetramine cupric sulfate, prepared from a solution of 7 parts by weight of crystallized copper sulfate by adding 50 parts by weight of 25% ammonia thereto, is introduced within a quarter of an hour while stirring at a temperature of 80° C. Then the mixture is stirred for another hour at 80° C. The excess sodium hydroxide is neutralized and the dyestuff is completely separated by the addition of salt after the solution has cooled. After drying it is a dark powder, being soluble in water with bluish-red coloration.

Example 2

5 parts by weight of the azodyestuff obtainable from diazotized 2-chloro-1-aminobenzene-5-sulfonic acid and beta-naphthol of the formula

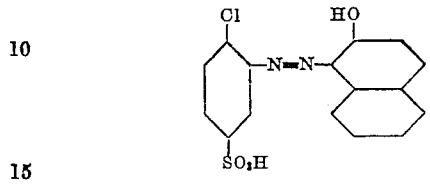

are dissolved in 400 parts by weight of hot water. After the addition of 10 parts by weight of crystallized sodium acetate and 10 parts by weight of 30% acetic acid a solution of 3 parts by weight of crystallized copper sulfate dissolved in 30 parts by weight of water is introduced within a quarter of an hour while stirring. Then 10 parts by weight of a solution of caustic soda 40° Bé. are added and the mixture is stirred for one hour at a temperature of 95° C. The dyestuff thus obtained is identical to the dyestuff obtained according to the directions given in Example 1.

Example 3

10 parts by weight of the azodyestuff obtainable from 1 mol of tetrazotized 3.3'-dichloro-4.4'-diaminodiphenyl and 2 mols of 2-hydroxynaphthalene-3.6-disulfonic acid of the formula

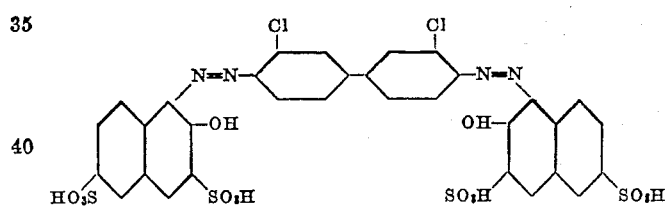

are dissolved in 500 parts by weight of hot water. After the addition of 20 parts by weight of a solution of caustic soda 40° Bé. and 30 parts by weight of 25% ammonia there is introduced within a period of one hour and a half the mixture of a solution of 7 parts by weight of crystallized copper sulfate dissolved in 30 parts by weight of water with 50 parts by weight of 25% ammonia while stirring at a temperature of 85° C. After stirring the mixture for a further hour at 85° C., it is cooled, acidified with acetic acid, and the dyestuff is separated by the addition of common salt. It is a dark powder, being readily soluble in water with a reddish-blue coloration.

Example 4

36.5 parts by weight of the azodyestuff obtainable from diazotized 3-chloro-2-amino-1-methylbenzene-5-sulfonic acid and resorcin of the formula:

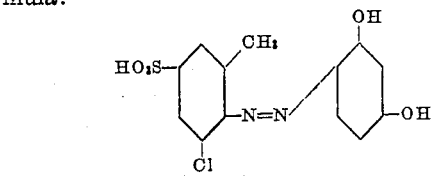

are dissolved in 400 parts by weight of water together with 45 parts by weight of copper sulfate with heating. At 80° C. a mixture of 30 parts by weight of glycerine and 80 parts by weight of a solution of caustic soda 40° Bé. is dropped in while stirring. Within 4 hours the temperature is raised to 95° C. The dyestuff thus obtained is separated after acidifying with acetic acid by the addition of common salt. After drying it is a brown powder, being soluble in water with orange coloration.

The glycerine of the above example may also be replaced by other compounds which, same as tartaric acid or pyridine, are able to keep copper in solution in an alkaline medium.

When replacing the 3-chloro-2-amino-1-methylbenzene-5-sulfonic acid by other aromatic amines halogenated in ortho-position to the amino group similar dyestuffs as described above are obtained, e. g. when using the 2-chloro-1-aminobenzene-5-sulfonic acid; when using the 1-chloro-2-aminonaphthalene-6-sulfonic acid a dyestuff yielding somewhat more reddish shades is obtained.

The resorcin may be replaced by meta-aminophenols, coupling in ortho-position to the OH-group.

Example 5

A solution of 100 parts by weight of the sodium salt of the trisazodyestuff obtainable from 1-aminobenzene-2.5-disulfonic acid, 1-amino-2.5-dimethylbenzene, 1-chloro-2-amino-5-hydroxynaphthalene-7-sulfonic acid and 2-hydroxynaphthalene-6-sulfonic acid having in the free state the formula:

 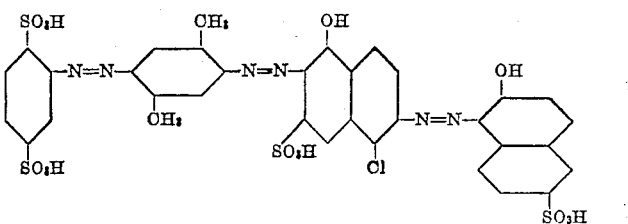

are dissolved in 400 parts by weight of water with heating, and thereto are added 70 parts by weight of glycerine, 35 parts by weight of crystallized copper sulfate and 100 parts by weight of a solution of caustic soda 40° Bé. The mixture is heated while stirring at 100° C. for several hours. Finally the dyestuff is isolated in the usual manner. It is a dark, bronzing powder and dyes cotton from a Glauber's salt-soda bath green shades.

Example 6

54 parts by weight of the dyestuff obtainable from 1 mol of diazotized 2.3-dichloro-4-amino 1-methylbenzene and 1 mol of 1-hydroxynaphthalene-3.6-disulfonic acid of the formula:

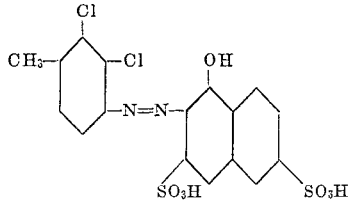

are dissolved in 2000 parts by weight of water of a temperature of 100° C. After the addition of an alkaline copper solution prepared from 35 parts by weight of crystallized copper sulfate, 50 parts by weight of glycerine, 150 parts by weight of water and 150 parts by weight of a solution of caustic soda 38° Bé., the mixture is heated for three hours at 100° C. while stirring. After cooling the crystallized dyestuff is sucked off. It is soluble in water with a violet coloration.

The 2.3-dichloro-4-amino-1-methylbenzene may be replaced by any aromatic amines being substituted in the ortho-position to the amino group by halogen; the 1-hydroxynaphthalene-3.6-disulfonic acid may be replaced by any aromatic hydroxy compounds coupling in the ortho-position to the hydroxy group.

The temperature and the time during which the coppering reaction takes place may vary, depending on the substituents present. Thus, for instance, the coppering of the dyestuff obtainable from 2.5.6-trichloroaniline-3-sulfonic acid and 1-hydroxynaphthalene-5-sulfonic acid is finished at a temperature of 80° C. within 15 minutes.

In many cases it is advantageous to work under pressure.

Example 7

65 parts of the dyestuff obtainable by coupling in the presence of bicarbonate one mol of diazotized 1-chloro-2.5-aminonaphthol-7-sulfonic acid with 1 mol of 1-naphthol-3.6-disulfonic acid of the formula:

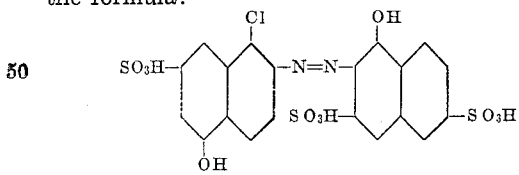

are dissolved in 3000 parts by weight of water at a temperature of 90° C. while stirring. After the addition of a solution of 33 parts by weight of crystallized copper sulfate with 50 parts by weight of glycerine and 150 parts by weight of a solution of caustic soda 40° Bé. in 500 parts by weight of water, the mixture is heated for five hours with stirring at a temperature of 90° C. The blue copper complex azodyestuff thus obtained is isolated in the usual manner.

When coupling this monoazodyestuff containing copper with 1 mol of a diazo- or diazoazocompound, greenish-blue to green cotton dyestuffs going directly on the fiber, are obtained. When using for instance the intermediate compound of benzidine with salicyclic acid an olive color is obtained; when using the diazotized para-aminobenzene-azo-salicyclic acid a bluish-olive color is obtained.

We claim:—

1. The process which comprises treating an azo dyestuff containing at least once the grouping

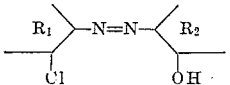

wherein $R_1$ and $R_2$ stand for radicals of the benzene or napththalene series, with a coppering agent in a caustic alkaline medium at temperatures between about 50° C. and about 120° C. until the chlorine atom in ortho-position with respect to the azo bridge is split off with the formation of the copper complex compound of the corresponding ortho-hydroxy azo dyestuff.

2. The process which comprises treating an azo dyestuff containing at least once the grouping

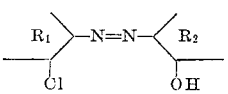

wherein $R_1$ and $R_2$ stand for radicals of the benzene or naphthalene series, with a coppering agent in aqueous caustic soda at temperatures between about 50° C. and about 120° C. until the chlorine atom in ortho-position with respect to the azo bridge is split off with the formation of the copper complex compound of the corresponding ortho-hydroxy azo dyestuff.

3. Process as claimed in claim 1, in which as coppering agent there is used a solution being obtained by causing a copper compound, glycerine and aqueous caustic soda to react upon each other.

4. Process as claimed in claim 2, in which as coppering agent there is used a solution being obtained by causing a copper compound, glycerine and aqueous caustic soda to react upon each other.

5. Process as claimed in claim 1, in which as coppering agent there is used a solution being obtained by causing a copper compound, tartaric acid and aqueous caustic soda to react upon each other.

6. Process as claimed in claim 2, in which as coppering agent there is used a solution being obtained by causing a copper compound, tartaric acid and aqueous caustic soda to react upon each other.

7. The process which comprises treating an azo dyestuff containing at least once the grouping

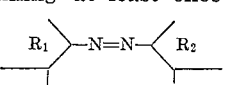

wherein $R_1$ stands for a radical of diazotized 1-chloro-2-amino-5-hydroxy-naphthalene-7-sulfonic acid and $R_2$ stands for a radical of the benzene or naphthalene series, with a coppering agent in a caustic alkaline medium at temperatures betwen about 50° C. and about 120° C. until the chlorine atom in ortho-position with respect to the azo bridge is split off with the formation of the copper complex compound of the corresponding ortho-hydroxy azo dyestuff.

8. The process which comprises treating an azo dyestuff containing at least once the grouping

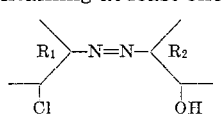

wherein $R_1$ stands for a radical of diazotized 1-chloro-2-amino-5-hydroxy-naphthalene-7-sulfonic acid and $R_2$ stands for a radical of the benzene or naphthalene series, with a coppering agent in aqueous caustic soda at temperatures between about 50° C. and about 120° C. until the chlorine atom in ortho-position with respect to the azo bridge is split off with the formation of the copper complex compound of the corresponding ortho-hydroxy azo dyestuff.

9. Process as claimed in claim 7, in which as coppering agent there is used a solution being obtained by causing a copper compound, glycerine and aqueous caustic soda to react upon each other.

10. Process as claimed in claim 8, in which as coppering agent there is used a solution being obtained by causing a copper compound, glycerine and aqueous caustic soda to react upon each other.

11. Process as claimed in claim 7, in which as coppering agent there is used a solution being obtained by causing a copper compound, tartaric acid and aqueous caustic soda to react upon each other.

12. Process as claimed in claim 8, in which as coppering agent there is used a solution being obtained by causing a copper compound, tartaric acid and aqueous caustic soda to react upon each other.

13. The process which comprises treating the azo dyestuff of the formula:

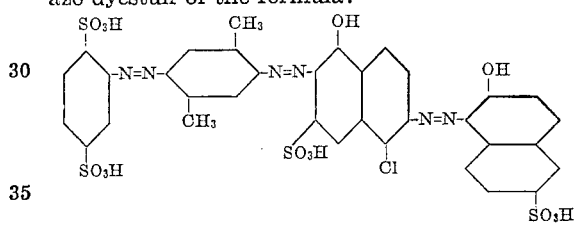

with a coppering agent in a caustic alkaline medium at a temperature of 100° C. until the chlorine atom in ortho-position with respect to the azo bridge is split off with the formation of the copper complex compound of the corresponding ortho-hydroxy azo dyestuff.

14. Process as claimed in claim 13, in which as coppering agent there is used a solution being obtained by causing copper sulfate, glycerine and aqueous caustic soda to react upon each other.

15. The process which comprises treating the azo dyestuff of the formula:

with a coppering agent in a caustic alkaline medium at a temperature of 90° C. until the chlorine atom in ortho-position with respect to the azo bridge is split off with the formation of the copper complex compound of the corresponding ortho-hydroxy azo dyestuff.

16. Process as claimed in claim 15, in which as coppering agent there is used a solution being obtained by causing copper sulfate, glycerine and aqueous caustic soda to react upon each other.

17. The process which comprises treating an azo dyestuff of the general formula:

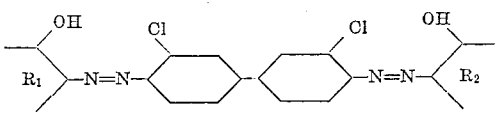

wherein $R_1$ and $R_2$ stand for radicals of the benzene or naphthalene series, with a coppering agent in a caustic alkaline medium at temperatures between about 50° C. and about 120° until the chlorine atoms in ortho-position with respect to the azo bridges are split off with the formation of the copper complex compound of the corresponding ortho-hydroxy azo dyestuff.

18. Process as claimed in claim 17, in which as coppering agent there is used a solution being obtained by causing copper sulfate, glycerine and aqueous caustic soda to react upon each other.

19. Process as claimed in claim 17, in which as coppering agent there is used a solution being obtained by causing copper sulfate, tartaric acid and aqueous caustic soda to react upon each other.

20. As new products the copper complex compounds having in the free state the probable general formula:

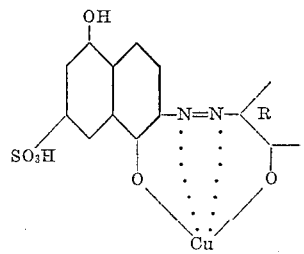

wherein R stands for a radical of the benzene or naphthalene series, and wherein the naphthalene nucleus may bear as substituent a diazo or diazoazo radical in ortho-position to the hydroxy group, being generally dark powders soluble in water in form of their alkali metal salts.

21. As a new product the copper complex compound of the probable formula:

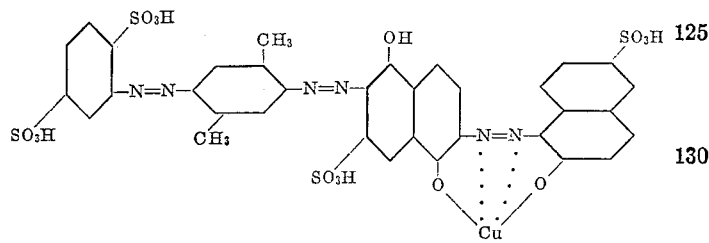

being a dark, bronzing powder, dyeing cotton from the Glauber's salt-soda bath green shades.

22. As a new product the copper complex compound of the probable formula:

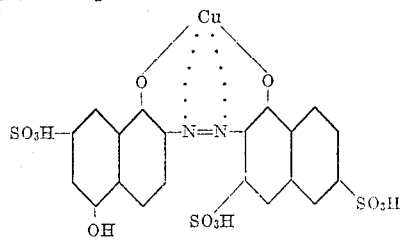

being a water-soluble dark powder.

DETLEF DELFS.
RUDOLF KNOCHE.